3,365,431
ETHYLENE SULFIDE POLYMERS
Riad H. Gobran, Levittown, and Stephen W. Osborn, Yardley, Pa., assignors to Thiokol Chemical Corporation, Bristol, Pa.
No Drawing. Continuation-in-part of applications Ser. No. 162,555, Dec. 27, 1961; Ser. No. 168,836, Jan. 25, 1962; Ser. No. 274,866, Apr. 22, 1963; Ser. No. 352,348, Mar. 16, 1964; and Ser. No. 357,300, Apr. 3, 1964. This application Dec. 3, 1965, Ser. No. 511,341
26 Claims. (Cl. 260—79.7)

ABSTRACT OF THE DISCLOSURE

Solid, high molecular weight moldable polymers having a major proportion by weight of recurring units derived from ethylene sulfide, and a positive melt index value at 215° C. below about 1.5 grams per minute.

---

This application is a continuation-in-part of our prior applications Ser. Nos. 162,555 filed Dec. 27, 1961, now abandoned; 274,866 filed Apr. 22, 1963, now abandoned; 168,836 filed Jan. 25, 1962, now abandoned; 352,348 filed Mar. 16, 1964 and 357,300 filed Apr. 3, 1964.

The present invention relates to solid polymers of ethylene sulfide, and more particularly, to novel, relatively high molecular weight, moldable ethylene sulfide polymers. The polymers of the invention comprise homopolymers of ethylene sulfide, as well as copolymers or interpolymers largely composed of ethylene sulfide units but also containing minor amounts of units derived from other monomers copolymerizable with ethylene sulfide such as other vicinal episulfide monomers. The present products are solid, high molecular weight, thermoplastic polymers having relatively high melting points. As pointed out in detailed below, they are further characterized by a relatively low melt index, i.e., a positive melt index value at 215° C. below about 1.5. They are capable of being molded at elevated temperatures to produce continuous plastic media in various configurations depending upon the forming process used. Hence they may be employed to produce a wide variety of molded articles.

For example, the present polymers can be molded to form pipe, tubing, containers, film, strips and funicular structures such as filaments, threads and rods, using any of the conventional molding procedures known to those in the art such as extrusion, compression or injection molding procedures. The articles thus formed have exceptional utility at elevated temperatures and particularly in the presence of solvents such as water, benzene, heptane, hexane, methanol, ethanol, acetone, acetonitrile, carbon tetrachloride, chloroform, dimethylformamide, dioxane, tetrahydrofuran, carbon disulfide, chlorobenzene, o-chlorobenzene, p-chlorotoluene and methylene chloride.

Certain of the properties of the present polymers vary as a function of the proportion of ethylene sulfide units they contain. Considering first the properties of the ethylene sulfide homopolymers, these polymers are highly crystalline materials as determined by X-ray diffraction. They have melting points of the order of 200° to 215° C. as determined microscopically using a Kofler hot stage at a heating rate of 3° C. per minute. They are also characterized by excellent solvent and chemical resistance. In molded form they have high heat distortion temperatures, low water absorption properties, extremely low deformation under load and excellent dimensional stability. More particularly, ethylene sulfide homopolymers can be prepared as disclosed herein having heat distortion temperatures (ASTM–D648) of the order of 300° to 320° F. using a 264 p.s.i. load, water absorption values (ASTM–D570) below 0.10% and deformation under load values (ASTM–D261) of the order of 0.10 to 0.30%.

For the most part the above-described physical properties of the homopolymers are modified to some extent in the case of the copolymers or interpolymers. For example, as the proportion of comonomer that is copolymerized with the ethylene sulfide monomer increases, the melting point and crystallinity of the resulting products tend to decrease. However, by the method disclosed herein copolymers containing up to 30% by weight of units derived from the copolymerizable monomer can be prepared which have melt indices at 215° C. below about 1.5 grams per minute and consequently have satisfactory molding properties. Moreover, copolymers containing up to say a few percent of copolymerizable monomer are, like the ethylene sulfide homopolymers, predominately crystalline. Hence those ethylene sulfide polymers of the invention that are predominately crystalline may be characterized as essentially homopolymeric poly(ethylene sulfide).

The ethylene sulfide polymers of the invention may be prepared by polymerizing ethylene sulfide either alone, or in conjunction with a minor amount of one or more other monomers which are copolymerizable therewith, in the presence of a catalyst such as a reaction product of diethyl zinc and water or diethyl zinc and hydrogen sulfide. Monomers which have been found to be readily polymerizable with ethylene sulfide using such catalysts are other vicinal episulfide monomers, preferably those containing 3 to 10 carbon atoms. Examples of such comonomers are alkylene sulfides such as propylene, 1,2-butylene, 2,3-butylene, isobutylene, and cyclohexene sulfides; styrene sulfide; vinylcyclohexane, vinylcyclohexene, paramethylstyrene and butadiene episulfides; 2-benzylthiirane; 1,2 - epoxy - 3,4-epithiobutane; and allylthioglycidyl ether. As indicated above, in order to obtain moldable polymers having the desired properties, the polymer should contain at least 70% by weight of units formed from ethylene sulfide, which units, in the polymeric backbone, will have the structure —$CH_2$—$CH_2$—S—. The precise structure of the present polymers is not known, that is to say, the extent, if any, to which the polymer molecules may be branched chains is not known, nor is it known whether the component units are distributed in a random or successive pattern in the polymer backbone.

As indicated above, the polymers of the present invention can be conveniently characterized in terms of their melt indices. The numerical values of melt index disclosed herein were obtained with a capillary flow plastometer of the type sold by F. F. Slocomb Corporation of Wilmington, Del. The test procedure used confronted generally to ASTM method D–1238–57T. In determining the melt indices, the plugged reservoir of the test instrument was preheated to and maintained at 215° C. ±2° C. and then charged with 4 to 6 grams of polymer within a 2-minute interval. A 5-kg. weight was then placed atop the charge by means of a ram and left there for 2.00 minutes. The 5-kg. weight was then replaced with a 2160-gram weight. After an additional 0.25 minute the plug was removed from the flow orifice of the reservoir, and the flow of polymer through the orifice was measured. The amounts of polymer which flowed through the orifice during each 1-minute interval were separately collected and weighed to the nearest milligram. The melt index values given herein are averages of the weights of the 1-minute samples collected over the first 5 minutes of the test. Thus if a total of 3.5 grams of polymer flowed through the orifice during the first five minutes of the test, the melt index of the polymer, as defined herein, would be 0.7 gram/minute.

Comparisons of the weights of different samples of a given type of polymer extruded within a given time interval by this procedure provide an indication of the relative molecular weights of the different samples, the lower flow weights per unit time interval indicating higher molecular weight materials. It has been found that ethylene sulfide polymers which have a melt index at 215° C. of less than about 1.5 grams/minute are readily moldable using injection, extrusion or other molding procedures. The term positive melt index value is used herein to indicate that the melt index is greater than zero.

Although ethylene sulfide polymers having a melt index at 215° C. of up to 1.5 grams/minute can be injection molded, it is preferable from the standpoint of ease of processibility to use, in injection molding procedures, a material having a melt index in the range 0.7 to 1.5 grams/minute. For extrusion molding procedures it is preferable to use ethylene sulfide polymers which have a melt index at 215° C. of no more than about 0.7 gram/minute.

The stability of the ethylene sulfide polymers of the present invention, under the rigorous molding temperatures commonly employed when molding such relatively high melting materials, can be improved by admixing with the polymers, as a stabilizer, about 0.5 to 2.5% by weight of the polymer of one or more amines such as octadecyl amine, branched octadecyldimethylamine and p-aminodiphenylamine, and/or one or more amide stabilizers such as nylon, acrylamide polymer and fatty acid polyamides. The stabilizer can be incorporated in the polymer by mechanically mixing it with the polymer in powder form. Stabilization of ethylene sulfide polymers with such amines and amides, among other stabilizers, is disclosed in application Ser. No. 267,605 filed Mar. 25, 1963; application Ser. No. 267,604 filed Mar. 25, 1963; application Ser. No. 312,847 filed Oct. 1, 1963; application Ser. No. 323,074 filed Nov. 12, 1963; application Ser. No. 349,799 filed Mar. 6, 1964 and application Ser. No. 477,288 filed Aug. 4, 1965. Polymers having different melt indices as defined herein can be mixed to produce blends having intermediate melt indices.

Articles molded from the present polymers at elevated temperatures and pressures exhibit good impact resistance and good machining properties, as well as other improved properties previously mentioned and considered in more detail in the examples given below. As indicated above, the polymers containing a high proportion of ethylene sulfide units are highly crystalline and the crystallinity of the polymer varies in inverse relation to the amount of comonomer units therein.

The polymers of the invention can be formed into continuous flexible films and molded by compression, injection or extrusion molding processes to a wide variety of articles having novel combinations of physical and chemical properties. The ethylene sulfide homopolymers in particular are substantially completely insoluble in a wide variety of solvents including water, benzene, heptane, hexane, methanol, ethanol, acetone, acetonitrile, carbon tetrachloride, chloroform, dimethylformamide, dioxane, tetrahydrofurane, carbon disulfide, chlorobenzene, o-dichlorobenzene, p-chlorotoluene, and methylene dichloride. The term "insoluble" as used in the preceding sentence signifies that when the polymer was shaken in the solvent at room temperature for 24 hours, there was no appreciable change in the refractive index of the solvent, and the polymer was recovered by filtration at the test temperature without loss in weight. It has been further found that ethylene sulfide homopolymers made by methods disclosed herein are also resistant to such solvents at elevated temperatures. For example, such homopolymers have been found to be substantially insoluble when heated in o-dichlorobenzene at 180° C. for a period of 4 hours.

The preferred catalyst for use in preparing the present polymers is a reaction product of diethyl zinc and either water or hydrogen sulfide. The molar ratio of diethyl zinc to water or hydrogen sulfide may vary from about 1:3 to 3:1. The diethyl zinc-water catalyst may be prepared by reacting the diethyl zinc and water in an inert hydrocarbon solvent, e.g., benzene or hexane, at a temperature of 0° to 85° C., preferably 20° to 50° C. The molar ratio of diethyl zinc to water is preferably approximately 1:1, although it may vary over the range indicated above. To insure optimum catalyst activity and the attainment of the highest molecular weights, the catalyst should be used within a period of not more than 48 hours after it is prepared and preferably as soon as possible after it is prepared. In most cases it will be found desirable to prepare the catalyst in the polymerization reaction vessel just prior to or coincident with the initiation of the polymerization reaction.

It has been found important that in cases where the highest molecular weights are desired the preparation of the catalyst and also the polymerization reaction be carried out in an environment substantially free from elemental oxygen and free from water other than that used in preparing the catalyst. Thus catalyst preparation and polymerization are desirably carried out in an atmosphere of inert gas such as nitrogen, helium, or argon containing less than about 20 parts per million of oxygen. Commercially available grades of diethyl zinc have been found suitable for use in the present invention. The water with which the diethyl zinc is reacted should be distilled water, preferably deoxygenated by boiling, followed by cooling under a pure nitrogen atmosphere. The hydrocarbon solvent used in preparation of the catalyst should desirably be either dried over sodium or freshly distilled.

The diethyl zinc-hydrogen sulfide catalyst can be prepared in the same general manner as indicated above for the diethyl zinc-water catalyst. The molar ratio of $H_2S$ to diethyl zinc employed may vary from about 0.5:1 to 1.2:1 with the preferred ratio being about 1:1. The diethyl zinc may be dissolved in the solvent and $H_2S$ gas bubbled through the solution or alternatively, a standard, saturated solution of $H_2S$ in hydrocarbon solvent can be mixed in predetermined proportions with a standard solution of diethyl zinc in a hydrocarbon solvent. The diethyl zinc-$H_2S$ catalyst, like the diethyl zinc-water catalyst, should be freshly prepared in a substantially oxygen-free environment and, if the highest molecular weights are desired, in an anhydrous environment.

Details of the polymerization process are given in the specific examples set forth below. In general, the polymerization process is executed by bringing the monomeric ethylene sulfide, or mixture of ethylene sulfide and other copolymerizable comonomer into contact with the catalyst prepared in the general manner rescribed above. The catalyst is desirably used to the extent of about 0.05% to 3% based on the weight of the monomer charge being polymerized. The preferred amount of diethyl zinc-water catalyst is about 1% to 2% and the preferred amount of the diethyl zinc-$H_2S$ catalyst is about 0.5%. The polymerization reaction can be carried out at temperatures of 20° C. to 80° C. over periods of a few minutes to 48 hours. Relatively high molecular weight products are obtained when the reaction system is maintained anhydrous except for the quantity of water required to form the diethyl zinc-water catalyst as described above.

The polymerization reaction may be conducted without using a solvent, or any of various inert organic solvents can be used such as aromatic hydrocarbons, e.g., benzene, toluene, or xylene; aliphatic hydrocarbons, e.g., isopentane, n-hexane, or octane; or chlorinated hydrocarbons, e.g., carbon tetrachloride, methylene chloride, or ethylene chloride. The reaction mixture may be agitated to facilitate the reaction. The pressure at which the reaction is carried out does not appear to be particularly critical. Thus the reaction may be carried out at atmospheric pressure or under autogenous or higher pressures. In any case the reaction mixture should desirably be kept oxygen-free by the use of an atmosphere of purified inert gas.

In order to point out more fully the nature of the present invention, the following specific examples are given of illustrative methods of making the present products.

*Example 1*

A solution of diethyl zinc-water catalyst was prepared prior to use in the polymerization described below with 252.2 millimoles/227 millimoles of diethyl zinc/$H_2O$ mixed under a blanket of nitrogen gas in 2270 ml. of dried benzene.

A 130 gal. reactor was sequentially charged with 170 lbs. (23.2 gal.) of dried benzene, 0.832 mole (50 lbs., 5.8 gal.) of dried ethylene sulfide monomer, and the total amount of catalyst solution that was previously prepared the same day, as described above, all under a blanket of nitrogen gas with agitation. The reactor was sealed, and the temperature of the reactant mixture was raised to about 176° F. and held thereat for 2 hours. The contents were then cooled, the reactor unsealed, and the wet polymer product dried first by centrifuging to spin off the liquid portions, then through vacuum drying at elevated temperatures not exceeding 118° F. The dried powdery white crystalline polymer product obtained had a melting point range of 208° to 214° C. and melt index average flow value for the first five minutes of flow at 215° C. of 0.12 g./min.

To demonstrate the insolubility of the homopolymers of the present invention 2.5 grams of the polymer prepared above was added to 50 grams of o-dichlorobenzene. The solvent had a refractive index of 1.5492 at 25° C. before the test, based on three readings of 1.5492, 1.5491 and 1.5492. The mixture of polymer and solvent were periodically agitated and held at a temperature of 180° C. for 4 hours and the undissolved polymer was then filtered from the solvent at 180° C. using a sintered glass filter. The solvent was then cooled to room temperature and it had a refractive index at 25° C. of 1.5490, based on four readings of 1.5489, 1.5490, 1.5490 and 1.5491. A control sample of solvent was also held at 180° C. for four hours, without polymer therein, and after being cooled to room temperature, it had a refractive index at 25° C. of 1.5492, based on three readings of 1.5491, 1.5492 and 1.5492.

Six samples of polymer made according to the procedure given above were injection molded into ½″ x ⅛″ x 3″ bars using conventional injection molding equipment (Unex Jet Plastic Molder, Hinchman Manufacturing Company, Inc., Roselle, N.J.). The molding and annealing conditions are given in Table I below. Molding was effected at three different temperatures, and two different annealing procedures, A and B, were used. In procedure A the molded article was water-cooled at tap water temperatures, whereas in procedure B the molded article was maintained at 180° C. for 7 minutes, followed by gradual atmospheric cooling to room temperature.

After annealing, the molded materials were tested for Izod impact strength, tensile strength, elongation, flexural strength and flexural modulus properties. The results are given in Table II below, wherein the standard ASTM tests used are identified. In Table II the numbers in parentheses indicate the number of tests run, the values given in the table being averages for the indicated number of tests.

TABLE I

| Cylinder temp., °F. | Nozzle temp., °F. | Mold temp., °F. | Annealing procedure |
|---|---|---|---|
| 378 | 450 | 171 | A |
| 378 | 450 | 257 | A |
| 415 | 485 | 302 | A |
| 378 | 450 | 171 | B |
| 415 | 485 | 257 | B |
| 415 | 485 | 302 | B |

TABLE II

| Izod Impact strength, ft.lb./in., ASTM D-256 | Tensile strength, p.s.i., ASTM D-638 | Elongation, percent ASTM D-638 | Flexural strength, p.s.i., ASTM D-790 | Flexural modulus, p.s.i., ASTM D-790 |
|---|---|---|---|---|
| 1.02 | 6,586 (5) | 3 (5) | 13,543 (5) | 315,440 (5) |
| 1.03 | 6,548 (3) | 4 (3) | 13,398 (5) | 369,860 (5) |
| 0.69 | 4,415 (5) | 3 (5) | 11,390 (5) | 400,880 (5) |
| 1.55 | 6,731 (5) | 3 (5) | 13,551 (5) | 345,825 (5) |
| 1.13 | 6,920 (3) | 4 (3) | 13,154 (4) | 382,575 (4) |
| 0.96 | 5,896 (5) | 2 (5) | 11,368 (5) | 388,360 (5) |

*Example 2*

A 10 gal. reactor was charged with 33.8 lbs. (4.6 gal.) of dried benzene under an atmosphere of nitrogen gas. To this was added 0.05 mole (0.901 ml.) of water with agitation. After 10 minutes of stirring, 49.5 ml. of a benzene solution containing 0.05 mole of diethyl zinc was added. Stirring was continued for 60 minutes, at the end of which time 37.6 moles (0.576 gal.) of ethylene sulfide monomer was added and the reactor was sealed. The reaction mixture was then held at 176° F. for 2 hours, then cooled and vented to a nitrogen atmosphere. The liquid portion of the product slurry was spun off in a centrifuge, and the solids obtained thereby were dried under vacuum at 120° F. for 8 hours. The vacuum was broken with nitrogen gas, and the dried polymer product was then cooled and used for physical property testing. It had a melting point of 204°–206° C. and a melt index average flow of 0.15 g./min. during the first five minutes at 215° C.

*Example 3*

A 100 gal. reactor was charged with 466.0 lbs. of dried benzene under an atmosphere of nitrogen gas. To this was added 0.953 mole (16.18 ml.) of water with agitation. After 10 minutes of stirring, 800.8 ml. of a benzene solution containing 0.953 mole of diethyl zinc was added. Stirring was continued for 30 minutes, at the end of which time 287 moles (38 lbs., 4.4 gal.) of dried ethylene sulfide monomer was added. Another 50 lbs. of dried benzene was added with agitation to give a total solvent charge of 70.4 gal., and the reactor was sealed. The reaction mixture was then maintained at 176° F. for 2 hrs., then cooled and vented to a nitrogen atmosphere. The product slurry was then filtered, and the solid crystalline product obtained thereby was dried under vacuum for 4 hours at an elevated temperature not exceeding 176° F. The vacuum was broken with nitrogen gas, and the dried polymer was then cooled and used for physical property testing. It had a melt index average flow of 0.16 g./min. during the first five minutes at 215° C.

*Example 4*

A 100 gal. reactor was charged with 254.2 lbs. (34.7 gal.) of dried benzene under an atmosphere of nitrogen gas. To this was added 0.378 mole (6.815 ml.) of water with agitation. After 10 minutes of stirring, 564.1 ml. of a benzene solution containing 0.378 mole of diethyl zinc was added. Stirring was continued for 60 minutes, at the end of which time 564.5 moles (75 lbs., 8.67 gal.) of dried ethylene sulfide monomer was added and the reactor was sealed. The reaction mixture was then held at 176° F. for 2 hours, then cooled and vented to a nitrogen atmosphere. The liquid portion of the product slurry was spun off in a centrifuge, and the solids obtained thereby were dried under vacuum for 4 hours at 120° F. The vacuum was broken with nitrogen gas, and the dried polymer product was then cooled and used for physical property testing. It had a melting point of 204.5–207° C. and a melt index average flow of 0.11 g./min. during the first five minutes at 215° C.

*Example 5*

A dry 30 oz. glass polymerization vessel was sequentially charged by mixing under a blanket of nitrogen gas 400 ml. of dried benzene, approximately 100 g. (100 ml.) of dried ethylene sulfide monomer, 0.0011 mole (0.02 ml.) of water and 0.58 ml. of a benzene solution containing 0.0011 mole of diethyl zinc. The vessel was sealed and the contents raised to and maintained at 80° C. for 2 hours with agitation. The wet white polymer thus obtained was dried at ≦10 mm. Hg vacuum in an oven at 60–70° C. for about 24 hours to produce 97.6 g. of a dried white powdery crystalline polymer product having a melting point of 208° C., and a melt index average flow at 215° C. during the first five minutes of flow of 0.11 g./min.

*Example 6*

In similar manner to Example 5, excepting that in the sequence of charge of reactants the benzene solution containing diethyl zinc was charged to the polymerization vessel prior to charge of water, 97.9 g. of a dried white powdery crystalline polymer product was obtained which had a melting range of 206° to 208° C. and a melt index average flow at 215° C. during the first five minutes of flow of 0.21 g./min.

*Example 7*

A dried white powdery crystalline polymer product was prepared according to the method of Example 6, the only change being that 0.00083 mole (0.015 ml.) of water was used rather than 0.0011 mole (0.02 ml.). The product had a melting point of 207–208° C. and a melt index average flow value of 0.19 g./min. at 215° C. for the first five minutes.

*Example 8*

Two polymerization bombs were each charged with 200 ml. of benzene, 200 ml. of ethylene sulfide and 10 ml. of a zinc diethyl/$H_2O$ catalyst solution (prepared by reacting 11.11 millimoles of $O_2$ free $H_2O$ with 11.11 millimoles of zinc diethyl in 100 ml. of benzene). The two bombs were then sealed and tumbled in an 80° C. water bath for 65 minutes. The bombs were then removed from the bath, cooled and opened. The solvent was removed from the resulting gel like mass in a vacuum oven at 50° C./1 mm. Hg. A white, fluffy powdered polymer product was thus obtained from each bomb as follows:

| Bomb | Grams of Polymer | Percent Yield |
| --- | --- | --- |
| #1 | 188.9 | 94 |
| #2 | 164.2 | 82 |

Quantities of polymer made in accordance with the foregoing procedure were compression molded into standard ASTM discs and bars using conventional equipment (PW-220 model press, Pasadena Hydraulics Inc., El Monte, Calif.). The molded objects were prepared in molds heated at 200°–205° C., and were then tested for various physical properties using standard ASTM molding and testing procedures indicated in Table III below. The results of these tests are indicated in the table.

TABLE III

| Molded Object | Test | Property Value |
| --- | --- | --- |
| 2″ disc (ASTM D-647, Fig. 2). | Hardness (Rockwell) ASTM D-789. | M91 |
| ½″ x ½″ x 5″ bar (ASTM D-647, Fig. 1) (Stentor). | Deformation under load, percent 2,000 p.s.i., 122° F., 24 hrs., ASTM D-621. | 0.117 |
| ½″ x ½″ x 5″ bar (ASTM D-647, Fig. 1) (Stentor). | Heat Distortion Temp., ° C. at 264 p.s.i., ASTM D-648. | 159 |
| 4″ disc (ASTM D-647, Fig. 2) (Standard). | Taber abrasion, 1,000 g., CS-17 wheel, mg. per 1,000 cycles, ASTM D-1044. | 25.9 |

*Example 9*

A 1 liter reaction flask equipped with a stirrer, nitrogen inlet and outlet tubes and a condenser was charged with 450 ml. of heptane. The flask was then purged with carefully purified nitrogen for 15 minutes, after which 75 ml. of solvent was distilled off under the nitrogen atmosphere to insure an oxygen-free and anhydrous environment. The system was then cooled to −70° C. and 0.1 gram (3 drops) of deoxygenated distilled water and 0.7 gram (14 drops) of a benzene solution of a commercial grade of diethyl zinc were successively added to the heptane through the nitrogen inlet tube. Equimolar quantities of the diethyl zinc and water were used.

The mixture in the flask was warmed to room temperature, and a cloudy precipitate of zinc ethoxide appeared. The mixture was again cooled to −70° C. and 30.0 grams of freshly distilled ethylene sulfide was added to the heptane solution. An exothermic reaction occurred which caused the temperature of the system to rise 8° C. When the reaction had subsided, the system was allowed to come to room temperature and stand overnight. A heavy white flocculent precipitate formed which was collected by vacuum filtration and extracted with two 200 ml. portions of methanol for several hours to remove residual catalyst. The resulting material was dried overnight in air. Residual solvent was removed by heating the product at about 45° to 50° C. in a vacuum oven at an absolute pressure of 1 mm.

The product thus obtained comprised 18.3 grams (60% of theory) of crystalline polyethylene sulfide which melted sharply at 203–4° C. to a clear liquid. When cooled in a thin layer it formed a highly flexible film. The product had a sulfur content of 51.03% and was insoluble in benzene. When subjected to an infra-red spectrographic analysis, it showed principal absorption maxima at 710, 1128 1170, 1245, 1400 and 2910 cm.$^{-1}$.

The powdered product thus obtained was molded in the following manner. A cylindrical positive pressure mold 37.5 mm. in diameter and 10 mm. deep was coated with a mold release (Dow-Corning Inc. DC–20) and baked in an oven at 100° C. for thirty minutes. The mold was then charged with 10 grams of the polyethylene sulfide powder. The piston was then introduced into the mold and the mold assembly placed between the platens of a hydraulic molding press. Molding was effected at a pressure of 18,000 p.s.i. at a temperature of 365° to 385° F. for a period of thirty minutes. The pressure was periodically removed during the molding period to permit any evolved gas to escape. The molded product was a tough plastic article which resisted severe impact stresses applied thereto.

*Example 10*

A flask of the type referred to in Example 9 was charged with 450 ml. of freshly distilled heptane and purged with nitrogen. 75 ml. of the heptane was distilled off under the nitrogen atmosphere. Approximately equimolar quantities of diethyl zinc solution and water were added to the heptane in the flask as in Example 9.

After standing overnight at room temperature, the contents of the flask were heated to 50–52° C. and 41.5 grams of freshly distilled ethylene sulfide (B.P. 54–55° C) were added to the heptane solution. A white flocculent precipitate began to form within ten minutes, and its volume gradually increased. Heating of the mixture was stopped after three hours, and the system was allowed to stand at room temperature overnight with the contents under nitrogen. Two forms of the polymer were recovered from the flask after removing the solvent and catalyst as described in Example 9. 27 grams (65% yield) of a white fluffy crystalline powder was obtained which melted at 206–207° C. to form a clear liquid. Cooling of the molten product in a thin layer yielded a highly flexible film. Also there was removed from the stirrer 3 grams of a tissue-paper thin film of polymer that was rubbery, semi-transparent, and melted sharply at 206° C. The total yield of product was 72%. Both portions of polymer product were insoluble in benzene.

The cylindrical mold of Example 9, previously coated with a mold release, was charged with 15 grams of the flocculent ethylene sulfide polymer produced as above. The polymer was molded at 14,000 p.s.i. and 400° F. for about 30 minutes. At ten-minute intervals the pressure was released briefly and then reapplied to permit the escape of any evolved gas. At the end of the 30-minute molding period, the mold was allowed to cool overnight. Parts of the mold came apart readily, and a slightly yellow tablet was removed. The molded product was hard and extremely resistant to impact.

*Example 11*

A clean, dry 30-ounce glass container was charged with 100 ml. benzene, 0.15 ml. of deoxydized water, and 2.0 ml. of a solution of diethyl zinc and benzene (0.00521 mol/ml.) and the mixture was agitated under a nitrogen atmosphere for four to ten minutes. 50 ml. of ethylene sulfide freshly distilled from calcium hydride was then added to the mixture in the container, and the container was flushed with nitrogen. Thereafter the container was capped with aluminum foil and allowed to stand at room temperature overnight. A solid white product was formed from which solvent was removed by heating the product under a vacuum at 60° C. The resulting dried white powdery polymer had a melting point of 203°–205° C. The yield was 24.7 grams (49.3% of theory).

*Example 12*

A thirty-ounce polymerization bottle was successively charged with 100 ml. of benzene and 0.15 ml. of water. The bottle was then flushed with nitrogen and charged with 2 ml. of a 0.00578 mol/ml. solution of zinc diethyl in benzene. The solution was alowed to stand at room temperature until it started to yellow, which took about two hours.

A nitrogen-filled 30-ounce polymerization bottle was successively charged with 50 ml. of freshly distilled ethylene sulfide and 10 ml. of the catalyst solution as prepared above. The contents of the bottle were thoroughly shaken after which the bottle was flushed with nitrogen, capped, and allowed to stand overnight at room temperature. Polyethylene sulfide was formed which was separated and heated at 35° C. to remove solvent in a vacuum oven under 1 mm. mercury vacuum for about four hours. A fluffy material was obtained comprising 13 grams (20% of theory). The polymer product had a melting point of 208–212° C. The molten product when cooled in a thin layer formed a thin flexible film.

*Example 13*

A 1-liter resin pot was fitted with a condenser, thermometer, stirrer and nitrogen gas inlet tube. 450 ml. of hexane were charged into the pot and 50 ml. of it were distilled off under nitrogen. The solvent was allowed to cool below 50° C. under nitrogen and 100 ml. of ethylene sulfide were pipetted into the pot. The pot and contents were then heated on a 75° C. water bath. When the system began to reflux, 10 ml. of a freshly prepared preformed diethyl zinc-$H_2S$ catalyst solution were added thereto. The catalyst comprised the reaction product of 5.0 ml. (0.00327 mole) of $H_2S$ and 0.492 ml. (0.00327 mole) of diethyl zinc dissolved in 50 ml. of benzene.

A polymer of ethylene sulfide began to form as soon as the catalyst solution was added. Further 10 ml. quantities of the catalyst solution were added to the pot at 30-minute intervals while the system was refluxing at a temperature of 57°–63° C. until all 50 ml. of the preformed catalyst system had been added.

A 300 mm. Widmer column was then connected to the resin pot in place of the condenser and fitted with a distillation head. Unreacted ethylene sulfide was distilled off at 55–59° C. at 760 mm. 88.5 cc. of the monomer was thereby recovered. A gas chromatographic analysis showed that the monomer contained approximately 25% hexane. The hexane remaining in the resin pot was now removed by steam distillation. The remaining white, powdery product was separated from the water in the pot by filtration and placed in a vacuum oven to dry at room temperature and 1 mm. of mercury pressure. The yield was 48.2%. Using a Fisher John's block melting point determination procedure, it was found that the polymer product had a melting point of 205° to 215° C. With a Kofler Micro Hotstage device the melting point was 204° to 210° C. (corrected). The melted polymers of the present example had a viscosity higher than the viscosities of the melted polymers of the preceding examples, thus indicating that the $H_2S$-diethyl zinc catalyst is capable of producing higher molecular weight products.

Some of the polymeric material made above when molded for ten minutes at 425° F. under approximately 2200 lbs. per square inch pressure yielded a paper-thin, 4-inch square flexible film.

One gram of the polyethylene sulfide produced above was added to 100 ml. of the reagent grades of each of four different solvents: benzene, methylene chloride, hexane and chloroform and shaken in the solvent for 24 hours at room temperature. A measurement of the refractive index of each of the solvents after this test showed that none of the polyethylene sulfide had dissolved in the solvent.

*Example 14*

A catalyst solution was prepared under nitrogen by dissolving 2 ml. of a benzene solution of diethyl zinc, containing 0.0111 mole of diethyl zinc, in 100 ml. of anhydrous benzene. To this solution was added 8.5 ml. of a solution of hydrogen sulfide in benzene containing .00555 mole of $H_2S$. The mixture was shaken frequently for about 30 minutes before use.

A steel bomb was washed, rinsed with water and then acetone, and then dried with nitrogen. 100 ml. (100.4 grams) of crude ethylene sulfide was filtered into the bomb through a medium sintered glass funnel. 5 ml. of the freshly prepared catalyst solution was pipetted into the bomb under nitrogen. The bomb's cap was screwed on using O rings to provide a tight seal. The bomb was then placed in an 80° C. water bath for four hours. The bomb was then removed and cooled to room temperature with tap water and opened. A slight pressure buildup in the bomb was noticed when the bomb was opened. The product was a white, very light weight powdery polymer which came out of the bomb in almost one solid mass. The yield was 90.2 grams or 90%. Melting point of the polymer was 206° to 210° C.

*Example 15*

An ethylene sulfide/propylene sulfide copolymer having approximately an 85/15 weight ratio of ethylene sulfide to propylene sulfide units was prepared as follows:

A clean 30-ounce bottle was flushed with nitrogen and successively charged with 100 ml. of benzene, 0.15 ml.

(0.0083 mol) of oxygen-free water and 10.90 ml. (0.0115 mol) of a 0.001055 mol/ml. solution of diethyl zinc in benzene, and the solution was allowed to stand at room temperature under a nitrogen atmosphere until it had developed a yellow color. 15 ml. (14.2 gm., 0.192 mol) of propylene sulfide were then added to the solution, and the system was allowed to stand at room temperature under a nitrogen atmosphere for three hours. By the end of this period the reaction mixture had started to thicken. The mixture was then placed in a steel bomb. 85 ml. (8.5 g., 1.43 mol) of ethylene sulfide were then changed into the reaction system and the system was allowed to stand at room temperature under a nitrogen atmosphere overnight. The resulting white polymer was dried overnight in a vacuum oven at 1 mm. Hg to remove the solvent and unreacted monomeric materials. 91 g. (91% yield) of a white powdery copolymer were obtained which had a melting point of 190–197° C. and an average melt index at 215° C. of 0.4 g./min.

*Example 16*

An ethylene sulfide/propylene sulfide copolymer having approximately an 85/15 weight ratio of ethylene sulfide to propylene sulfide units was prepared as follows:

A clean 30-ounce bottle was flushed with nitrogen and successively charged with 100 ml. of methylene chloride, 0.15 ml. (0.0083 mol) of oxygen-free water and 10.90 ml. (0.0115 mol) of a 0.001055 mol/ml. solution of diethyl zinc in benzene. The solution was allowed to stand at room temperature under nitrogen until a yellow color developed. 15 ml. (14.2 g., 0.192 mol) of propylene sulfide were then added to the solution and the system was allowed to stand at room temperature under nitrogen until the solution began to thicken, which took about 3 hours. The mixture was then placed in a steel bomb. 85 ml. (8.5 g., 1.43 mol) of ethylene sulfide were then charged into the reaction system and the system was allowed to stand under nitrogen at room temperature overnight. The resulting polymeric mass was dried overnight in a vacuum oven at 1 mm. Hg to remove the solvent and unreacted monomeric materials. 90 g. (90% yield) of a white powdery copolymer were obtained which had a melting point of 190°–205° C. and an average melt index at 215° C. of 0.5 g./min.

*Example 17*

An ethylene sulfide/propylene sulfide copolymer having approximately a 100/5 weight ratio of ethylene sulfide to propylene sulfide units was prepared as follows:

A steel bomb was flushed with nitrogen and charged successively with 50 ml. of benzene, 0.042 ml. of oxygen-free water, 5 ml. of propylene sulfide which had been fully distilled from calcium hydride and 2.2 ml. (2.3 mmoles) of diethyl zinc. The reaction mixture was swirled under a nitrogen atmosphere. A total of 100 ml. of freshly distilled ethylene sulfide was added to the reaction mixture in increments over a period of approximately ½ hour.

The reaction system was allowed to stand at room temperature under an atmosphere of nitrogen overnight. The solid reaction product was dried overnight in a vacuum oven at 50° C./1 mm. Hg to yield 103 g. (98% yield) of a white powder having a melting range of 195–200° C. and an average melt index at 215° C. of 0.6 g./min.

*Example 18*

An ethylene sulfide/propylene sulfide copolymer having approximately at 95/5 weight ratio composition was prepared as follows:

A steel bomb was flushed with nitrogen and charged successively with a mixture of 95 ml. of freshly distilled ethylene sulfide and 5 ml. of freshly distilled propylene sulfide, 400 ml. of heptane, and 20 ml. of a catalyst solution. The catalyst solution was prepared by reacting 21.2 millimoles of diethyl zinc and 0.40 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 94 g. (94% yield) of a white powdery product were obtained, having a melting range of 165–198° C. and an average melt index at 215° C. of 0.7 g./min.

*Example 19*

A terpolymer having approximately an 85/10/5 weight ratio of ethylene sulfide/propylene sulfide/butylene sulfide units was prepared as follows:

A steel bomb was flushed with nitrogen and charged successively with a mixture of 85 ml. of freshly distilled ethylene sulfide, 10 ml. of freshly distilled propylene sulfide and 5 ml. of freshly distilled butylene sulfide, 400 ml. of heptane, and 20 ml. of a catalyst solution. The catalyst solution was prepared by reacting 11.1 millimoles of diethyl zinc and 0.20 ml. of oxygen-free water in 100 ml. of tetrahydrofuran. The reaction mixture was heated to 80° C. and allowed to remain at this temperature in an atmosphere of nitrogen for two hours. The resulting terpolymer was recovered by drying the solid reaction product overnight in a vacuum oven at 50° C./1 mm. Hg. 100 g. (100% yield) of a white powdery product were obtained, having a melting range of 187–195° C. and an average melt index at 215° C. of 1.2 g./min.

*Example 20*

A copolymer having approximately a 90/10 weight ratio of ethylene sulfide to propylene sulfide units was prepared as follows:

A steel bomb was flushed with nitrogen and charged successively with a mixture of 90 ml. of freshly distilled ethylene sulfide and 10 ml. of freshly distilled propylene sulfide, 400 ml. of heptane, and 20 ml. of a catalyst solution. The catalyst solution was prepared by reacting 21.2 millimoles of diethyl zinc and 0.40 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 94 g. (94% yield) of a white powdery product were obtained, having a melting range of 170–203° C. and an average melt index at 215° C. of 0.6 g./min.

*Example 21*

A copolymer having approximately a 75/25 weight ratio of ethylene sulfide to propylene sulfide units was prepared as follows:

A steel bomb was flushed with nitrogen and charged successively with a mixture of 75 ml. of freshly distilled ethylene sulfide and 25 ml. of freshly distilled propylene sulfide, 400 ml. of heptane, and 20 ml. of a catalyst solution. The catalyst solution was prepared by reacting 21.2 millimoles of diethyl zinc and 0.40 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 97 g. (97% yield) of a white powdery product were obtained, having a melting range of 175–190° C. and an average melt index at 215° C. of 1.2 g./min.

*Example 22*

A copolymer having approximately a 95/5 weight ratio of ethylene sulfide to cyclohexene sulfide units was prepared as follows:

A steel bomb was flushed with nitrogen and charged successively with a mixture of 95 ml. of freshly distilled ethylene sulfide and 5 g. of freshly distilled cyclohexene sulfide, 400 ml. of heptane, and 20 ml. of a catalyst solution. The catalyst was prepared by reacting 21.2 millimoles of diethyl zinc and 0.35 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 93 g. (93% yield) of a white powdery product were obtained, having a melting range of 202–205° C. and an average melt index at 215° C. of 1.1 g./min.

*Example 23*

A copolymer having approximately a 98/2 weight ratio of ethylene sulfide to propylene sulfide units was prepared as follows:

A steel bomb was flushed with nitrogen and charged successively with a mixture of 98 ml. of freshly distilled ethylene sulfide and 2 ml. of freshly distilled propylene sulfide, 400 ml. of heptane, and 20 ml. of a catalyst solution. The catalyst was prepared by reacting 11.1 millimoles of diethyl zinc and 0.20 ml. of oxygen-free water in 100 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 96 g. (96% yield) of a white powdery product were obtained, having a melting range of 201–203° C. and an average melt index at 215° C. of 0.4 g./min.

*Example 24*

A terpolymer having approximately an 80/10/10 weight ratio of ethylene sulfide/propylene sulfide/butylene sulfide units was prepared as follows:

A steel bomb was flushed with nitrogen and charged successively with a mixture of 80 ml. of freshly distilled ethylene sulfide, 10 ml. of freshly distilled propylene sulfide, and 10 ml. of freshly distilled butylene sulfide, 400 ml. of heptane, and 20 ml. of a catalyst solution. The catalyst was prepared by reacting 11.1 millimoles of diethyl zinc and 0.20 ml. of oxygen-free water in 100 ml. of tetrahydrofuran. The reaction mixture was heated to 80° C. and allowed to remain at this temperature in an atmosphere of nitrogen for two hours. The resulting terpolymer was recovered by drying the solid reaction product overnight in a vacuum oven at 50° C. 1 mm. Hg. 96 g. (96% yield) of a white powdery product were obtained, having a melting range of 185–190° C. and an average melt index at 215° C. of 1.0 g./min.

*Example 25*

A copolymer having approximately a 95/5 weight ratio of ethylene sulfide to butylene sulfide units was prepared as follows:

A steel bomb was flushed with nitrogen and charged successively with a mixture of 95 ml. of freshly distilled ethylene sulfide and 5 g. of freshly distilled butylene sulfide, 400 ml. of heptane, and 20 ml. of a catalyst solution. The catalyst was prepared by reacting 21.2 millimoles of diethyl zinc and 0.35 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 98 g. (98% yield) of a white powdery product were obtained, having a melting range of 199–203° C. and an average melt index at 215° C. of 0.3 g./min.

*Example 26*

A copolymer having approximately a 95/5 weight ratio of ethylene sulfide to allylthioglycidyl ether units was prepared as follows:

A steel bomb was flushed with nitrogen and charged successively with a mixture of 95 ml. of freshly distilled ethylene sulfide and 5 g. of freshly distilled allylthioglycidyl ether, 400 ml. of heptane, and 20 ml. of a catalyst solution. The catalyst was prepared by reacting 11.1 millimoles of diethyl zinc and 0.20 ml. of oxygen-free water in 100 ml. of tetrahydrofuran. The reaction mixture was heated to 80° C. and allowed to remain at this temperature for two hours. The resulting copolymer was recovered by drying the solid reaction product overnight in a vacuum oven at 50° C./1 mm. Hg. 98 g. (98% yield) of product were obtained, having a melting range of 200–205° C. and an average melt index at 215° C. of 0.1 g./min.

*Example 27*

This example illustrates the difference in molding properties between a first polymer (Polymer A) made according to the present invention and a second polymer (Polymer B) made according to a prior art process for making ethylene sulfide homopolymers, i.e., that described in an article by Boileau et al, entitled, "Macromolecular Chemistry—Polymers of Ethylene Sulfide and Propylene Sulfide," published in Compte Rendus 252, 882 (1961).

Polymer A was made as follows: The polymerization was carried out in five 30 oz. glass polymerization bottles. Each glass bottle was sequentially charged with 400 ml. of dried benzene, 100 ml. of dried ethylene sulfide monomer, 0.0011 mole (0.02 ml.) of water and 1 ml. of a benzene solution containing 0.0011 mole of diethyl zinc. The charging was carried out under nitrogen and the bottles were capped. The bottles were placed in a polymerization bath set at 80° C. for 2 hours, with agitation. The wet white polymer thus obtained was dried in an oven at 50° C. under vacuum for about 24 hours. The melting point of this polymer ranged from 205°–207° C. When 4 gms. of this polymer were tested for melt index at 215° C., the melt index of the polymer was found to be 0.274 gm./min.

Polymer B was made as follows: A 3-neck 3 liter flask equipped with a stirrer was charged with 1250 ml. of a 3.5% aqueous sodium hydroxide solution having a pH of 11.8. As the catalyst solution was being stirred, 500 ml. of ethylene sulfide was added thereto dropwise. Within a short period of time a polymer was seen to be formed. A slight exotherm developed, and the flask was cooled externally. This reaction mixture was allowed to stand overnight with continuous stirring. The next day the polymer product was filtered and washed to yield 485 gms. of a fine white powder. The polymer had a melting point of 193°–194° C. When 4 gms. of this material was tested for melt index at 215° C., the entire sample flowed out of the test instrument in less than 1 minute. This indicates that the polymer had a melt index of more than 4 gms./min. at 215° C.

MOLDING PROCEDURE

The polymers were molded using a hydraulically operated ram jet injection molding machine (Hinchman Mfg. Co., Inc., Roselle, N.J.), injecting into a 4-inch long tensile bar mold. Since Polymer A was rather fluffy, it was difficult to feed to the processing machinery, and accordingly, was compacted into 4-inch discs which were broken into chips for ease of loading. Polymer B fed easily and was therefore used without compacting.

During molding the cylinder temperature was maintained at 177°–205° C. The mold was pre-heated to 125° C. before use, and cooled during use to 115° C. The injection pressure was 1100 p.s.i. The molding cycle included a 5–10 second dwell time of the polymer in the cylinder, and a cooling time of up to 30 seconds.

The tensile bar molded from Polymer A was removed from the mold and tested in a standard tensile tester with the following results:

Tensile strength _____ p.s.i__ 4000  
Elongation at break _____ percent__ 1.43  
Tensile modulus _____ p.s.i__ 283,000

The bar molded from Polymer B could not be tested at all. Upon opening the mold it was found that the bar had broken into several pieces. The material was so brittle that no tensile test could be performed thereon.

The foregoing test results show that an ethylene sulfide polymer of the type disclosed in the Boileau et al. article is incapable of being molded to produce a molded article having acceptable physical properties, whereas the polymers claimed in this application yield useful moldings.

*Example 28*

A copolymer having approximately a 80/20 weight ratio of ethylene sulfide to butylene sulfide units was prepared as follows:

A steel bomb was flushed with nitrogen and charged successively with a mixture of 80 ml. of freshly distilled ethylene sulfide and 20 g. of freshly distilled butylene sulfide, 400 ml. of heptane, and 20 ml. of a catalyst solution. The catalyst solution was prepared by reacting 21.2 millimoles of diethyl zinc and 0.35 ml. of oxygen-free water in 200 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 99 g. (99% yield) of a white powdery product were obtained, having a melting range of 199–203° C. and an average melt index at 215° C. of 1.3 g./min.

*Example 29*

A copolymer having approximately a 70/30 weight ratio of ethylene sulfide to propylene sulfide units was prepared as follows:

A steel bomb was flushed with nitrogen and charged successively with a mixture of 70 ml. of freshly distilled ethylene sulfide and 30 ml. of freshly distilled propylene sulfide, 400 ml. of heptane, and 20 ml. (2.22 millimoles) of a catalyst solution consisting of 10.5 ml. of diethyl zinc, 0.20 ml. of oxygen-free water, and 100 ml. of tetrahydrofuran. The reaction mixture was heated to 80° C. and allowed to remain at this temperature in an atmosphere of nitrogen for two hours. The resulting copolymer was recovered by drying the solid reaction product overnight in a vacuum oven at 50° C./1 mm. Hg. 94 g. (94% yield) of product were obtained, having a melting point of 165–175° C. and an average melt index at 215° C. of 1.5 g./min.

*Example 30*

A dry 30 oz. glass polymerization vessel was sequentially charged with mixing under a blanket of nitrogen gas with 400 ml. of dried benzene, approximately 100 g. (100 ml.) of dried ethylene sulfide monomer, 0.0011 mole (0.02 ml.) of water and 0.74 ml. of a benzene solution containing 0.0011 moles of diethyl zinc. The vessel was sealed and the contents raised to and maintained at 80° C. for 2 hours with agitation. The wet white polymer thus obtained was dried at $\leqq 100$ mm. Hg vacuum in an oven at 60–70° C. for about 24 hours to produce 70 g. of a dried white powdery crystalline polymer product having a melting point of 204–208° C.

When tested as in ASTM D–621 using a 2000 p.s.i. load for 24 hours at 122° F., a four ply laminate of molded polymer in the form of ½" cubes exhibited a deformation under load of 0.26%.

When tested as in ASTM D–570 (24 hours at 73° F.) ⅛" x ½" x 5" molded samples of the polymer exhibited a water absorption value of 0.01%.

When tested as in ASTM D–648 (264 p.s.i. load) ⅛" x ½" x 5" molded samples of the polymer exhibited a heat distortion temperature of 303° F.

It is of course to be understood that the foregoing examples are intended to be illustrative only and that numerous changes can be made in the ingredients, proportions and conditions specifically disclosed therein. For example, minor amounts of monomers other than the vicinal episulfides mentioned above can be incorporated in the backbone of the polymeric materials of the present invention to produce interpolymers having positive melt index values below about 1.5 grams/minute at 215° C. "Minor amount" in this context is intended to mean an amount of the non-vicinal episulfide monomer sufficiently small that it neither produces any significantly adverse effect on the molding properties of the resulting interpolymer nor increases the melt index of the interpolymer above about 1.5. Among the other monomers that can be so used are cyclic sulfides having the structure:

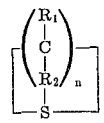

in which $n=3$ to 6, and $R_1$ and $R_2$ may be hydrogen, a branched or linear alkyl group having from 1 to 10 carbon atoms, an aryl, an arylalkyl and/or an alkylaryl group. $R_1$ and $R_2$ may also be heterocyclic, alicyclic, bicyclic or polycyclic. Examples of such cyclic sulfides are trimethylene sulfide, pentamethylene sulfide and hexamethylene sulfide.

Also minor amounts of units derived from various ethylenically unsaturated monomers may be incorporated in the present polymers. Such unsaturated monomers include olefins, such as ethylene, propylene, butylene and isobutylene; conjugated and non-conjugated dienes, such as butadiene, isoprene and 1,4 pentadiene; and vinyl compounds, such as styrene, vinyl acetate, ethyl acrylate, methyl acrylate, methyl methacrylate, butyl acrylate, acrylonitrile, vinyl isobutyl ether, methyl styrene, hydroxy propyl methacrylate, tetrafluoroethylene, chlorotrifluoroethylene and hexafluoropropylene. Still other compounds that may be used in minor amount have the structure:

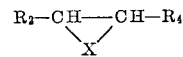

in which X is oxygen or nitrogen and $R_3$ and $R_4$ may be hydrogen, a branched or linear alkyl group having from 1 to 10 carbon atoms, an aryl, an aralkyl and/or an alkylaryl group. $R_3$ and $R_4$ may also be heterocyclic, alicyclic, bicyclic or polycyclic. Examples of such compounds are styrene oxide, ethylene oxide, propylene oxide, 1,2-butylene oxide, 2,3-butylene oxide, ethylene imine and propylene imine. Still other compounds that may be used in minor amount are formaldehyde, trioxane, hydroxyisobutyric acid, tetrahydrofuran, 1,3-dioxolane 1,4-dioxane, trimethylene oxide, tetramethylene oxide and pentamethylene oxide.

Other modifications within the scope of the invention will be apparent to those skilled in the art.

We claim:
1. A solid, high molecular weight, moldable, predominately crystalline, essentially homopolymeric poly(ethylene sulfide) having a positive melt index value at 215° C. below about 1.5 grams per minute.
2. A solid, high molecular weight, moldable, predominately crystalline, essentially homopolymeric poly(ethylene sulfide) having a positive melt index value at 215° C. below about 0.7 gram per minute.
3. A solid, high molecular weight, moldable, predominately crystalline, essentially homopolymeric poly(ethylene sulfide) having a melting point between 200° and 215° C. and a positive melt index value at 215° C. below 1.5 grams per minute.
4. A solid, high molecular weight, moldable, predominately crystalline, essentially homopolymeric poly(ethylene sulfide) substantially insoluble in o-dichlorobenzene at 180° C. and having a positive melt index value at 215° C. below 1.5 grams per minute.
5. A solid, high molecular weight, moldable predominately crystalline, essentially homopolymeric poly(ethyl- ene sulfide) substantially insoluble in o-dichlorobenzene at 180° C. and having a melting point of 200° to 215° C. and a positive melt index value at 215° C. below 1.5 grams per minute.

6. A molded object molded under heat and pressure from the polymer defined in claim 1.

7. A molded object molded under heat and pressure from the polymer defined in claim 2.

8. A solid, high molecular weight, moldable polymer consisting essentially of ethylene sulfide units and from 0 to 30% by weight of said polymer of units derived from at least one vicinal episulfide having 3 to 10 carbon atoms, said polymer having a positive melt index value at 215° C. below about 1.5 grams per minute.

9. A solid, high molecular weight, moldable polymer having a positive melt index value at 215° C. below about 1.5 grams per minute and selected from the group consisting of homopolymers of ethylene sulfide and interpolymers containing at least 70% by weight of ethylene sulfide units and up to 30% by weight of units derived from at least one other vicinal episulfide monomer selected from the group consisting of propylene sulfide, 1,2-butylene sulfide, 2,3-butylene sulfide, isobutylene sulfide, cyclohexene sulfide, styrene sulfide, vinyl cyclohexane sulfide, vinyl cyclohexene sulfide, para-methyl styrene sulfide, butadiene monoepisulfide, butadiene diepisulfide, 2-benzyl thiirane; 1,2-epoxy-3,4-epithiobutane and allylthioglycidyl ether.

10. An interpolymer according to claim 9 and wherein at least one of said other vicinal episulfides is propylene sulfide.

11. A polymer according to claim 9 and wherein at least one of said other vicinal episulfides is at least one of said butylene sulfides.

12. A polymer according to claim 9 and wherein said other vicinal episulfides are propylene sulfide and at least one of said butylene sulfides.

13. A polymer according to claim 9 and wherein at least one of said other vicinal episulfides is cyclohexene sulfide.

14. A polymer according to claim 9 and wherein at least one of said other vicinal episulfides is allylthioglycidyl ether.

15. A solid, high molecular weight, moldable ethylene sulfide polymer having a positive melt index value at 215° C. below about 1.5 grams per minute.

16. A solid, high molecular weight, moldable ethylene sulfide polymer having a positive melt index value at 215° C. below about 1.5 grams per minute, a melting point of about 200 to 215° C. and being substantially insoluble in o-dichlorobenzene at 180° C.

17. A solid, high molecular weight, moldable polymer having a positive melt index value at 215° C. of up to about 1.5 grams per minute and formed from at least 70% by weight of ethylene sulfide and up to 30% by weight of at least one other vicinal episulfide monomer.

18. A solid, high molecular weight, moldable polymer having a positive melt index value at 215° C. of up to about 1.5 grams per minute and at least 70% by weight of recurring —$CH_2$—$CH_2$—S— units in its polymeric backbone.

19. A solid, high molecular weight, moldable polymer having a positive melt index value of 215° C. of up to about 1.5 grams per minute and a major portion by weight of recurring —$CH_2$—$CH_2$—S— units in its polymeric backbone.

20. A solid, high molecular weight, moldable polymer having a positive melt index value at 215° C. of up to about 1.5 grams per minute and formed from at least a major amount of ethylene sulfide units.

21. A solid, high molecular weight, moldable polymer having a positive melt index value at 215° C. of up to about 1.5 grams per minute and formed from at least 70% by weight of ethylene sulfide units.

22. As a new article of manufacture, an article molded from an ethylene sulfide polymer having a melting point of at least about 200° C. and a melt index of less than about 1.5 grams per minute at 215° C.

23. As a new article of manufacture, an article molded from stabilized ethylene sulfide polymer, said polymer having a melting point of at least about 200° C. and a melt index of less than about 1.5 grams per minute at 215° C.

24. An article as in claim 23 which is shaped in the form of a sheet.

25. An article as in claim 23 which is tubular in shape.

26. An article as in claim 23 which is funicular in shape.

References Cited

UNITED STATES PATENTS

| | | | |
|---|---|---|---|
| 3,000,865 | 9/1961 | Gurgiolo | 260—79 |
| 3,222,326 | 12/1965 | Brodoway | 260—79.7 |
| 3,225,120 | 12/1965 | Baker | 260—874 |
| 3,300,454 | 1/1967 | Osborn | 260—79.7 |

FOREIGN PATENTS 700,998  12/1964  Canada.

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,365,431                January 23, 1968

Riad H. Gobran et al.

It is hereby certified that error appears in the above numbered patent requiring correction and that the said Letters Patent should read as corrected below.

Column 1, line 37, for "detailed" read -- detail --; column 2, line 51, for "confronted" read -- conformed --; column 4, line 50, for "rescribed" read -- described --; column 11, line 11, for "8.5" read -- 85.5 --; same line 11, for "changed" read -- charged --; line 36, for "8.5" read -- 85.5 --; line 68, for "at" read -- a --; column 12, line 38, for "colution" read -- solution --; column 16, lines 38 to 40, the formula should appear as shown below instead of as in the patent:

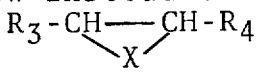

(SEAL)     Signed and sealed this 8th day of April 1969.

Attest:

Edward M. Fletcher, Jr.                     EDWARD J. BRENNER

Attesting Officer                           Commissioner of Patents